Feb. 7, 1933. M. LOUGHEAD 1,896,452
BRAKE MECHANISM
Filed Jan. 12, 1929 2 Sheets-Sheet 1
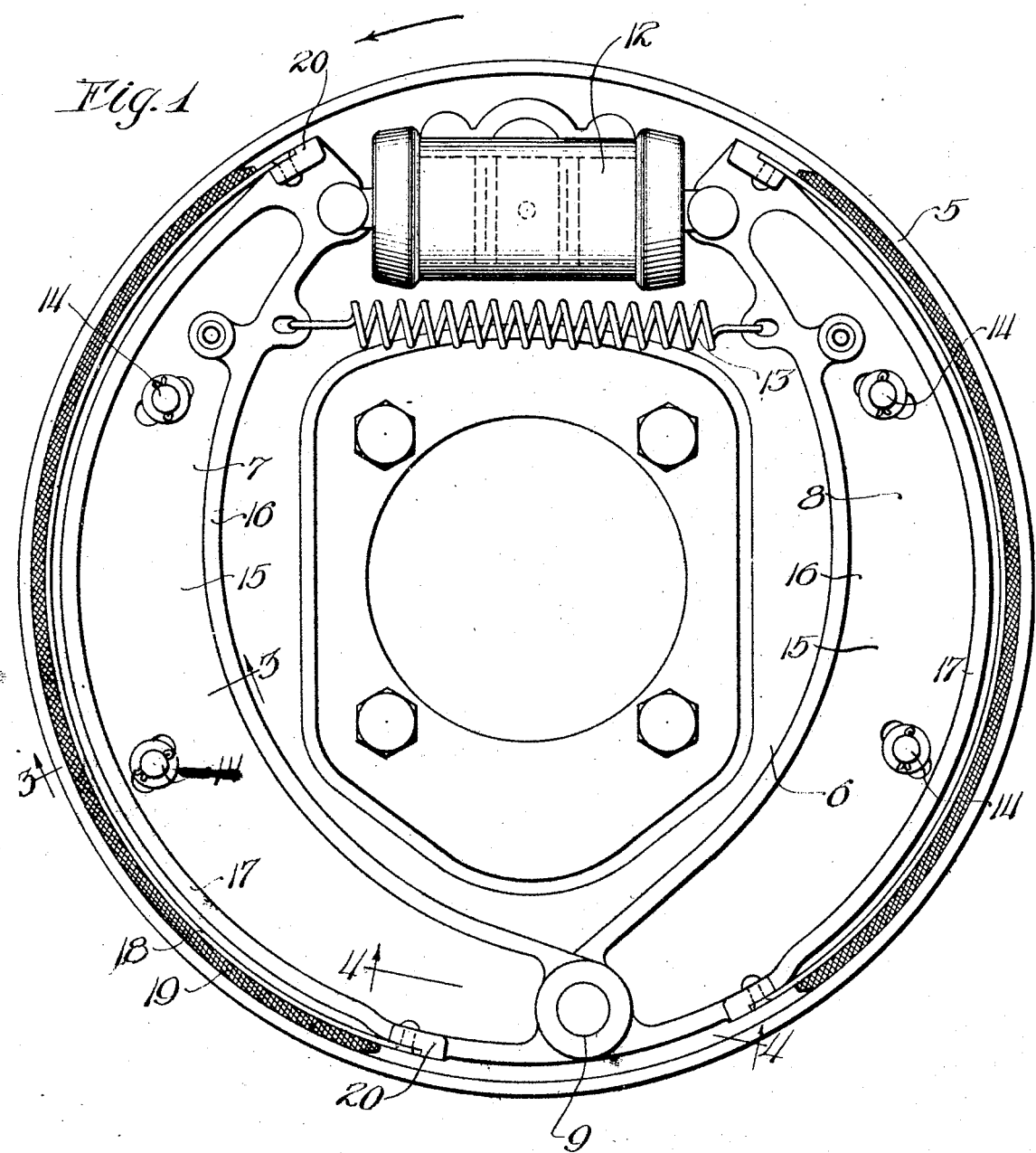
Inventor
Malcolm Loughead
By Williams, Bradbury, McCaleb & Hinkle
Attys.

Feb. 7, 1933. M. LOUGHEAD 1,896,452
BRAKE MECHANISM
Filed Jan. 12, 1929    2 Sheets-Sheet 2
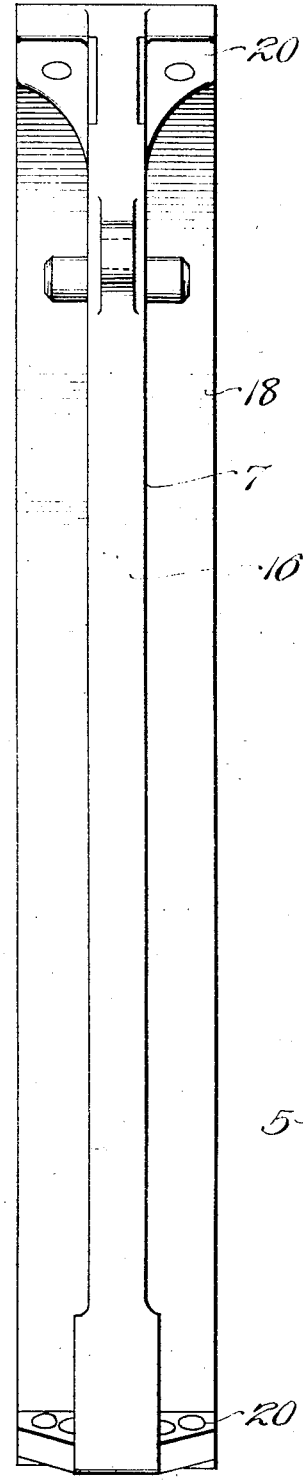
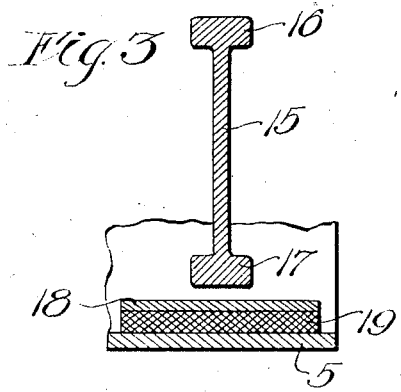
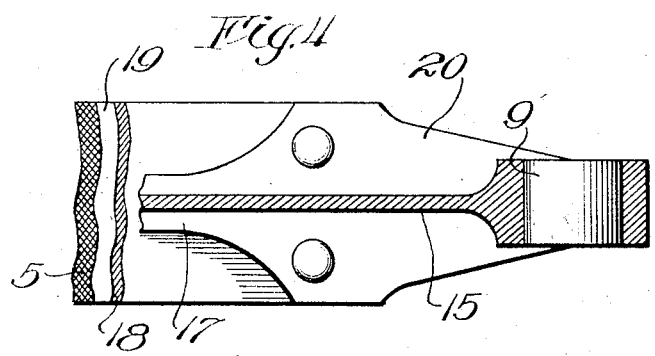
Inventor:
Malcolm Loughead
By Williams, Bradbury, McCaleb & Hinkle
Attys.

Patented Feb. 7, 1933

1,896,452

UNITED STATES PATENT OFFICE

MALCOLM LOUGHEAD, OF DETROIT, MICHIGAN, ASSIGNOR TO HYDRAULIC BRAKE COMPANY, OF DETROIT, MICHIGAN, A CORPORATION OF CALIFORNIA

BRAKE MECHANISM

Application filed January 12, 1929. Serial No. 332,093.

This invention relates to a brake mechanism, and more particularly to a device for engaging the frictional surfaces of a brake mechanism.

In brake mechanism of the type in which a rigid pivoted member is employed to engage a frictional surface with a rotating drum, considerable difficulty has been experienced in maintaining a uniform pressure contact between the frictional surface and the drum, resulting in inefficient braking and rapid wear of certain parts of the frictional surfaces.

An object of the invention is to provide a brake mechanism in which a uniform pressure contact is maintained between the frictional surfaces.

Another object of the invention is to provide a device for eliminating the danger of locking the brake.

Another object of the invention is to provide a self-adjusting device to compensate for wear of the brake lining.

A clear understanding of the invention may be had by reference to the following description, taken in conjunction with the accompanying drawings, in which Fig. 1 is a front elevational view partly in section of a brake mechanism embodying the invention;

Fig. 2 is a side detail elevation of the brake shoe;

Fig. 3 is a sectional view taken on lines 3—3 of Fig. 1; and

Fig. 4 is a sectional view taken on lines 4—4 of Fig. 1.

Referring to the drawings, the invention is illustrated in connection with a brake mechanism of the internal brake type in which a rotatable drum 5, which is attached to a vehicle wheel or other rotatable member (not shown) encloses the operating parts of the brake mechanism, which are supported on a pan 6. A pair of brake shoes 7 and 8 are pivotally mounted upon an anchor pin 9 which is attached to the lower portion of the pan 6. The shoes are actuated by a fluid motor 12 which serves to move the shoes to their operative position, from which they are returned to their normal position by a spring 13.

In order to guide the brake shoes along their path of movement, a plurality of guide pins 14, which are attached to the pan 6, project through slots in the shoes which extend along arcs about the anchor pin 9.

Each of the brake shoes comprises a web 15, which is provided with an internal flange 16 and an external flange 17. The external flange 17 has an intermediate arcuate periphery for a major portion of its length and terminates at each end in a raised portion 20 on a slightly greater radius. The raised portion of the flange is also made wider and serves as an attaching portion for a resilient band 18 of steel or other suitable material. By attaching the band 18 to the raised portions of the flange it is spaced from the central circular portion of the flange and a flexible brake lining 19 of any suitable frictional material is secured to the portion of the band which is spaced from the flange. This construction permits of the replacement of the resilient band 18 and the brake lining 19 as a unit when the brake lining becomes worn.

If upon the application of the brake, any portion of the brake lining 19 comes in contact with the drum 5 in advance of any other portion, the portion so coming in contact will be depressed due to the flexing of the resilient band 18 and other portions of the brake lining will be elevated a corresponding amount until an equal pressure is exerted over the entire area of the brake lining.

When the brake lining becomes worn, the upper portion of the lining will tend to come in contact with the drum first, since the upper portion of the brake shoe moves through a longer arc about the anchor pin 9. There will, however, be no braking effect until the entire brake lining is forced against the drum, because as soon as the upper portion of the lining comes into contact with the drum, it will be depressed until the entire lining comes in contact with the drum, after which a uniform pressure will be exerted over the entire area of the brake lining. It has been found that by engaging the frictional surfaces as described above, the tendency for the brakes to squeak can be practically eliminated.

Upon the application of the brake a large amount of heat is generated, which causes an expansion and increase in diameter of the drum. A portion of this heat is also communicated to the resilient band and causes a corresponding expansion therein, allowing the brake lining and the drum to remain in contact throughout the area of the lining. The brake shoe will be affected only slightly by the heat due to the air space between the band and the shoe and there will therefore be no distortion of the brake shoe.

For a given angular movement of a brake shoe about its pivot, the toe of the brake shoe travels through a much greater arc than does the heel of the shoe. When a brake mechanism is originally adjusted with a new lining on the brake shoe, the stops and other parts of the mechanism are so adjusted that a given angular movement of the brake shoe about its pivot will bring both the toe and heel portions of the brake lining into engagement with the brake drum simultaneously. As the brake lining wears, however, a greater and ever greater angular movement of the shoe is required in order to bring the brake lining into contact with the drum, and as this angular movement is increased the tendency is for the toe portion of the brake lining to engage the drum before the heel portion of the lining engages the drum. This results in a gripping action and also tends to produce higher pressure on the lining against the toe of the shoe and thus unequal wear and shorter life for the brake lining.

Applicant's construction avoids these difficulties. As wear occurs on applicant's brake lining, it will of course be necessary to move the brake shoes through greater and greater distances in order to bring them into contact with the brake drum and this will tend to produce engagement between the toe portion of the brake lining and the brake drum before the rest of the brake lining comes into contact with the drum. However, with applicant's novel mechanism, this early engagement of the toe portion of the brake lining will not produce any appreciable braking effect since the toe portion of the brake lining is not rigidly supported and will give inwardly, thus bulging the rest of the brake lining outwardly toward the brake drum and producing a uniform engagement between the entire length of the brake lining and the internal surface of the brake drum.

The invention has been described and illustrated in connection with a brake of the internal type. It will be readily apparent, however, that the invention is equally applicable to other types of brakes, and many modifications will be apparent without departing from the spirit and scope of the invention which is to be limited only by the appended claims.

I claim:

1. A brake shoe for frictional cooperation with a brake drum, comprising a rigid body portion, an arcuate peripheral flange intermediate the ends of said body portion, raised band mounting portions at the ends of said arcuate flange, a flexible brake band mounted on said mounting portions and extending in an arc from one to the other concentrically with and spaced from said arcuate flange, and means preventing said band being forced into engagement with said arcuate flange intermediate its ends when engaging a brake drum.

2. A brake shoe for frictional cooperation with a brake drum, comprising a rigid body portion having an end designed for pivotal mounting and a second end designed for engagement with a brake applying means, mounting portions adjacent the ends of said body portion, a flexible brake band mounted on said mounting portions and extending in an arc from one to the other, and means preventing the intermediate portion of said band being forced into engagement with the body portion by pressure against a brake drum.

3. A brake shoe for frictional cooperation with a brake drum, comprising a rigid body portion having an end designed for pivotal mounting and a second end designed for engagement with a brake applying means, mounting portions adjacent the ends of said body portion, a flexible brake band mounted on said mounting portions and extending in an arc from one to the other, the radius of the arc formed by the periphery of said band being the same as the radius of curvature of the friction surface of the drum with which it is adapted for frictional cooperation, and means preventing the intermediate portion of said band being forced into engagement with the body portion by pressure against a brake drum.

4. A brake shoe for frictional cooperation with a brake drum, comprising a rigid body portion having an end designed for pivotal mounting and a second end designed for engagement with a brake applying means, mounting portions adjacent the ends of said body portion, a flexible brake band mounted on said mounting portions and extending in an arc from one to the other, the radius of the arc formed by the periphery of said band being the same as the radius of curvature of the friction surface of the drum with which it is adapted for frictional cooperation, and means positively preventing longitudinal movement of the ends of said brake band, thereby preventing movement of the intermediate portion of the band against the body portion of the shoe.

5. A brake shoe for frictional cooperation with a brake drum, comprising a rigid body portion, mounting portions adjacent the ends of said body portion, a flexible brake band mounted on said mounting portions and extending in an arc from one to the other, lugs on said body portion adjacent said mounting portions engaging the ends of said bands and preventing movement thereof, a friction member on said band fixed thereto in an arc for frictional engagement with a brake drum, the radius of curvature of the periphery of said friction member being the same as the radius of curvature of the friction surface of the drum with which it is adapted for cooperation, whereby engagement of the intermediate portion of the brake band with the body of the shoe upon application of the brakes is prevented.

In witness whereof, I hereunto subscribe my name this 13th day of December, 1928.

MALCOLM LOUGHEAD.